Nov. 22, 1966

B. F. CRAIG 3,287,722

REMOTE CONTROLLED SWITCHING SYSTEM

Filed May 7, 1962

BRYANT F. CRAIG
INVENTOR.

BY D. Carl Richards
attny.

United States Patent Office
3,287,722
Patented Nov. 22, 1966

3,287,722

REMOTE CONTROLLED SWITCHING SYSTEM

Bryant F. Craig, 1808 E. Abrams, Arlington, Tex.

Filed May 7, 1962, Ser. No. 192,890
5 Claims. (Cl. 340—310)

The present invention relates to switching systems and more particularly to a remote controlled switching system adapted for use with the power lines or circuits normally available in homes and other buildings.

In homes, hospitals and other buildings, it is often desirable to actuate an alarm, light or other device that is remotely located from the operator. For example, patients in hospitals commonly summon a nurse or other attendant by closing a switch to cause a remotely located light or alarm to sound. Home owners may find it desirable to install remotely located alarms or floodlights.

The present invention provides a means whereby a device to be controlled is connected to the existing power circuits at a point remote from the operator. Means are provided that allow the operator to control the operation of the device without the necessity for providing separate control circuits between the device and the operator or utilizing expensive and complex radio wave transmitting and receiving gear.

In accordance with the present invention, a system for signaling a receiving station from a sending station on a power line is provided. An oscillator circuit including an oscillator tube is conected to the line for actuating the oscillator on alternate half cycles of the power voltage. The output of the oscillator is connected to the line. A frequency-determining circuit in the oscillator is connected across the line whereby the frequency of oscillation is controlled by said tuning circuit and by the impedance of said line for application to said line of spaced pulses of oscillations of frequency much higher than the power frequency on said line. A receiver circuit at said receiving station includes a tuning circuit connected across the line. A control system dependent upon the impedance of said tuning circuit and the impedance of said line serves to connect a utilization device to the line. Preferably, relay means connected in circuit with a thyratron is employed for applying power to the utilization device in response to the receipt at the receiving station of signals from the transmitter.

In one specific embodiment of the invention, an oscillator tuned to a frequency of the order of 40 kilocycles is connected across the power line. The preferred oscillator operates on the positive portion of each cycle of alternating current and does not require a D.C. power supply. To facilitate connection of the oscillator to the power circuits, the oscillator is constructed to have a pair of terminals which allow the oscillator to be plugged into conventional convenience outlets.

The preferred sensing apparatus utilizes a tuned series inductance capacitance network and a gas discharge tube. The presence of high frequency signals of the proper frequency on the line will cause the tube to fire, thereby actuating a rely operated switch. When the switch closes, the power controlled device is connected to the power circuit. Provision is made to prevent the relay from being operated by spurious high frequency signals, thereby preventing undesired operation of the controlled device.

The sensing apparatus is also provided with a pair of terminals to facilitate connection of the sensing apparatus to the power circuit. The sensing apparatus further includes a standard convenience outlet to allow the sensing apparatus to be used with a variety of controlled devices.

Preferably, the oscillator is one in which the resonant frequency of the tank circuit is dependent to a large extent upon the load present on the power circuit. In similar manner, the resonant frequency of the tuned circuit provided in the sensing apparatus varies according to the load on the power circuit thereby providing automatic frequency tracking between the oscillator and the sensing element.

Other objects and advantages of the invention will become apparent from the following detailed description taken in conjunction with the accompanying drawings wherein like reference characters denote like parts and in which.

Figure 1:
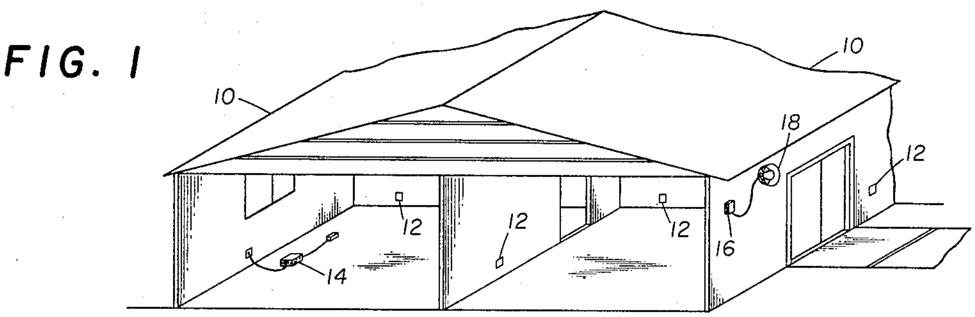
FIGURE 1 is a cut away perspective view of a portion of a home or other building illustrating the manner in which the present invention may be utilized.

Turning now to the drawings and more particularly to FIGURE 1, a cut away perspective view of a building 10 is shown. A number of conventional convenience outlets 12 are shown at various locations along the interior and exterior walls of the buildings. Normally, a primary power circuit is provided with the convenience outlets connected in parallel to this primary power circuit. Particular convenience outlets may or may not be controlled by wall switches. However, the primary power circuit is not affected by the operation of the switches utilized to control particular convenience outlets.

In practicing the invention, a device 14 is plugged into one of the convenience outlets 12. Device 14 will be referred to hereafter as transmitter 14.

The sensing apparatus, hereinafter referred to as a receiver 16, is also plugged into a convenience oulet 12 and, for example, a light 18 is connected to the receiver 16. As convenience outlets are normally provided at many points about a building, the transmitter 14 and receiver 16 may easily be located and relocated at desired points without the necessity for changing the wiring in the building.

Figure 2:
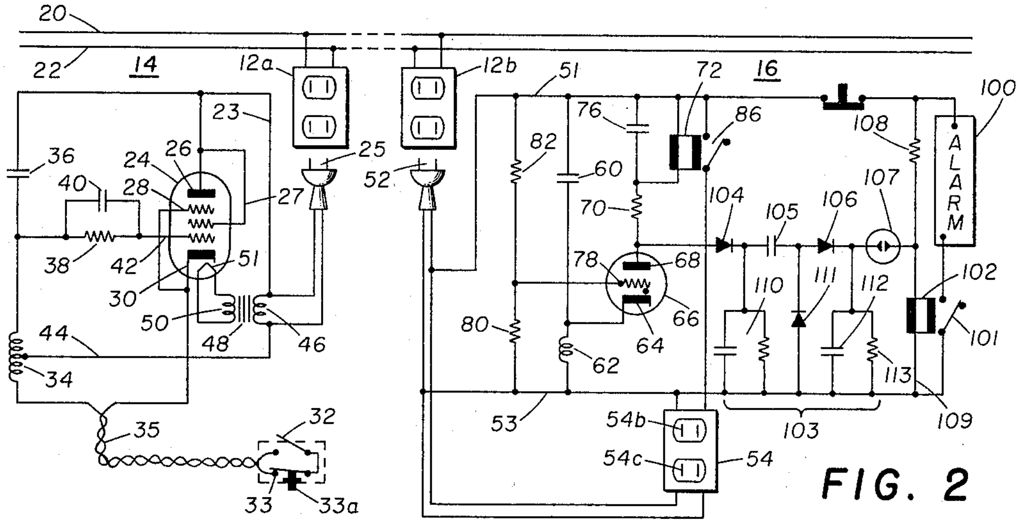
FIGURE 2 is a schematic diagram illustrating the circuitry utilized in a preferred embodiment of the invention.

FIGURE 2 illustrates schematically the preferred transmitter and receiver to be used in practicing the invention. As shown, the reference characters 20 and 22 designate the 60-cycle power line or primary circuit normally available in a utility system. A pair of standard female convenience outlets 12*a* and 12*b* are connected to the lines 20 and 22 in parallel relationship at points along the lines 20 and 22 remotely spaced one from the other.

The transmitter used in practicing the invention is denoted by the reference character 14. Preferably, it is packaged within a small case and includes a pair of male terminals 25 suitable for insertion into the outlet 12*a*, thereby facilitating connection of the transmitter 14 to the power lines 20 and 22. It is practical for the transmitter 14 to be mounted in a housing of molded construction in size generally corresponding to that of a convenience outlet cover-plate. The terminals 25 preferably are mounted on the back of such housing to support the housing over the outlet.

The plate 26 of the pentode 24 is connected to the plug 25 by line 23 as shown. The pentode 24 is connected with the screen grid 27 common to the plate 26. The suppressor grid 28 is connected to the cathode 30. It is recognized that these connections cause the pentode 24 to function as a triode.

The cathode 30 of tube 24 is connected by way of series switches 32 and 33 to the lower terminal of the inductor 34. The switch 32 may be encased within the case of the transmitter 23 or, if desired, a cord 35 may be used to permit the switch 32 to be located on a bed or table.

The other terminal of the inductor 34 is connected by way of capacitor 36 to the plate 26 of pentode 24. The juncture between the inductor 34 and the capacitor 36 is connected by way of a parallel circuit comprising a resistor 38 and capacitor 40 to the control grid 42 of the tube 24. A tap 44 on the inductor 34 is connected to plug 25.

The primary winding 46 of a filament transformer 48 is connected between tap 44 and plate 26 and, therefore, directly across plug 25. The secondary winding 50 of transformer 48 is connected to the filament 52 of tube 24.

The circuit thus far described is a modified type of Hartley oscillator in which the tuned circuit is formed by the series-parallel circuit comprising the tapped inductor 34 and the capacitor 36. The interelectrode capacitance of the tube 24 and the reactance of the loads present on the power circuit also affect the resonant frequency of the transmitter. The resistor 38 and capacitor 40 in parallel are recognized as the conventional grid leak bias network. Thus, while the frequency of the oscillator may be fixed primarily by the lumped circuit elements shown, the frequency will vary significantly in response to changes in the load on the lines 20, 22, the load generally changing intermittantly as power-consuming elements are switched on and off in normal operation of a home or other facility.

According to one specific example of the invention, a 6AQ5 tube was used connected as a triggerable unidirectional conductive device. The inductance of inductor 34 was 15 millihenries. The capacitance of capacitors 36 and 40 was 0.005 microfarad each and resistor 38 was of 10,000 ohms. Using the above components, the oscillator operated at a frequency of 40 kilocycles. By way of the example and for purposes of the following discussion, it will be assumed that the oscillator operates at a frequency of 40 kilocycles. However, by changing the capacitance of capacitor 36, the frequency can be varied over a wide useful range.

It is to be noted that a D.C. power supply is not provided for the tube 24. The tube 24 is chosen to be one which operates at low plate voltages. The positive plate voltage necessary for operation of the tube 24 is supplied by the positive half cycles of the alternating 60-cycle current. The oscillator circuit described will, therefore, be operative only during positive half cycles of the alternating current.

The oscillator circuit will, of course, be inoperative when either switch 32 or 33 is open. However, when the switches 32 and 33 are closed, a signal having the waveform shown in curve B of FIGURE 3 will be produced. Curve A illustrates the waveshape of the normally available 60-cycle current and is provided to illustrate the phase relationship between the short burst of 40-kilocycle voltage produced by the oscillator and the normal 60-cycle current. It will be observed that the oscillator is inoperative during the negative half cycles of the 60-cycle wave and that the 40-kilocycle pulses produced by the oscillator are confined to a waveform having an envelope that follows the positive high half cycles of the 60-cycle voltage.

The receiver 16 provided according to the preferred embodiment of the invention is quite similar in its external physical appearance to the transmitter 14. It is packaged within a small case and includes a pair of male plugs 52 for insertion into the convenience outlet 12*b*. A female convenience outlet 54 is provided to enable a controlled device to be readily connected or disconnected from the receiver 16. The receiver 16 may also be of molded construction.

The receiver circuit shown in FIGURE 2 includes a pair of lines 51 and 53 connected to the plug 52 as shown. An essential element of the receiver 16 is a series resonant circuit comprising the capacitor 60 and the inductor 62. The series circuit is connected between lines 51 and 53 with the upper terminal of capacitor 60 connected to line 51 and the lower terminal of inductor 62 connected to line 53.

The juncture between the condenser 60 and the inductor 62 is connected to the cathode 64 of a thyratron 66. The plate 68 of the thyratron 66 is connected through resistor 70 to the coil 72 of a relay. The other side of the coil 72 is connected to the line 51. Capacitor 76 is connected in parallel with the relay coil 72. The control electrode 78 of the gas tube 66 is connected to the juncture of a pair of resistors 80 and 82. The resistors 80 and 82 are connected between the lines 51 and 53 and form a voltage dividing network.

One terminal outlet 54 is connected to line 51 through the relay operated switch 86. The other terminal of outlet 54 is connected to line 53.

According to one specific example of the invention, the resistance of resistor 80 was 12,000 ohms and the resistance of resistor 82 was 18,000 ohms. Capacitor 60 had a capacitance of 270 micro-microfarads and inductor 62 had an inductance of 60 millihenries. Tube 66 was type 5823. The resistor 70 was 2,200 ohms and capacitor 76 had a capacitance of 270 micro-microfarads. The relay coil 72 had a resistance of 2,300 ohms and required 6 milliamperes of current to be energized.

In the following description of the operation of the system of FIGURE 2, it will be assumed that when the transmitter 14 is plugged into outlet 12*a* and receiver 16 is plugged into outlet 12*b*, that lines 23 and 51 are connected to line 20. The transmitter 14 and receiver 16 will only be operative during those half cycles of the 60-cycle power when line 20 is positive with respect to line 22.

Figure 3:
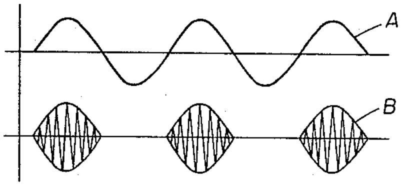
FIGURE 3 illustrates the waveforms provided by the transmitter portion of the present invention.

If the switches 32 and 33 are closed, the transmitter 14 will be operative, and during each positive half cycle a high frequency pulse having the waveshape shown in FIGURE 3 will be produced.

The voltage divider network comprised of resistors 80 and 82 is such that the potential applied to the control electrode 78 will bias the tube 66 to prevent conduction in the presence of the normal 60-cycle voltage, and the switch 86 will remain open.

The series tuned circuit comprised of the capacitor 60 and inductor 62 is resonant to the frequency of the pulses produced by the transmitter 14. While elements 60–62 primarily control the frequency response of receiver 16, the load on the lines 20–22 also controls the response as hereinafter explained. If a negative pulse appears on the line 20 during the positive half cycle of the 60-cycle voltage, the cathode 64 of the tube 66 will become sufficiently negative with respect to the control grid 78 to cause the thyratron 66 to fire. Once the thyratron 66 fires, it will continue in its conductive state until the plate 68 either becomes more negative than the cathode 64 or the cathode 64 is approximately the same potential as the plate 68.

Current will flow from the line 53 to the line 51 through the inductor 62, thyratron 66, the resistor 70 and the relay coil 72 when the thyratron 66 is in its conductive state. Current will also flow from the plate 68 of the tube 66 through the capacitor 76.

The capacitor 76 connected in parallel with the relay coil 72 effectively increases the time constant of the relay 72 in the manner well known in the art. Thus, the capacitor 76 must become substantially fully charged before the current flowing through the relay will be sufficient to cause the relay to act. On the other hand, the relay will be maintained energized by the discharge of the capacitor 76 for several cycles in the absence of conduction by the tube 66. With the particular components used, the time constant of the relay 72, that is the time for the relay 72 to become energized or deenergized, is approximately 0.5 second.

From the above, it is obvious that although spurious signals of the proper frequency may be present on the line 51, there is scant possibility that they will be a sufficiently long duration to charge the capacitor 76 to an extent that will allow the relay 72 to be energized. Thus, excellent discrimination is provided against relatively short transient noise on the line and fail safe operation is assured in that the relay 72 will be operated only in response to the receipt of the proper signals from the transmitter 14. On the other hand, failure of the transmitter 23 to function on occasional positive half cycles will not adversely affect operation of the controlled device by causing the relay switch 86 to open.

It will be readily apparent from the foregoing description that plugs 25 and 52 of the transmitter 14 and the receiver 16, respectively, must be connected to the same line of the power circuit. If one of the plugs 25 and 52 is reversed relative to the other, the system will be inoperative since the plate 68 of the tube 66 in the receiver 16 will be positive during half cycles which are alternate to those during which the transmitter 14 is operative. This, however, can readily be ascertained by observing the gas tube 66. If the oscillator is operative and the gas tube 66 is not firing, the terminals of either of the transmitter or the receiver may be reversed to provide compatibility.

This represents an initial test for placing the transmitter and receiver in operation. It also provides for independent operation of two transmitters and two receivers of the same power circuit without interference. That is to say, one transmitter and receiver can be connected in one sense to the primary power circuit and the other transmitter and receiver can merely be reversed so that they will operate independently.

Figure 4:
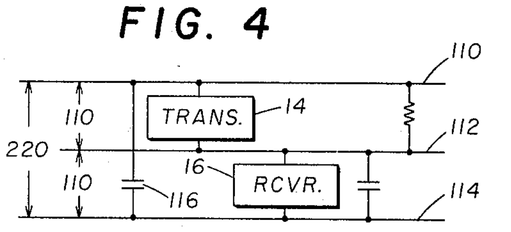
FIGURE 4 illustrates the manner in which the present invention may be utilized in a 3-wire system.

It will also be recognized that the electrical load is a variable factor in a power system and that it may be either resistive, capacitive, or conductive. As the character of the electrical load varies, the resonant frequency of the series circuit associated with the receiver 16 will vary, changing the frequency to which the receiver will be sensitive. This factor must, of course, be coped with in any operative system of transmitter and receiver. The present invention provides for this, utilizing an oscillator for a transmitter in which the tank circuit associated with the transmitter is connected across the lines and also connecting the tuned circuit of the receiver across the line such that any change in the character in the load reflected like changes in the resonant frequencies of the transmitter and the receiver. Although the resonant frequency of the receiver 16 will not track the resonant frequency of the transmitter 14 precisely if severe capacitive or inductive loads are placed across the power circuit, sufficiently close tracking has been obtained to allow the units to be used over the ranges of loads ordinarily encountered.

Where a 220-volt system is utilized, it will usually be a 3-wire system such as is shown in FIGURE 4. As shown in FIGURE 4, three separate conductors 110, 112 and 114 are provided. The voltage between line 112 and either line 110 or line 114 is 110 volts and the voltage between lines 110 or 114 is 220 volts. In such an installation, the wire 112 is normally common to most points in the building. In a home having such a system, it may be desirable to locate the transmitter at a receptacle served by lines 110 and 112 and the receiver must be located at a position serviced by lines 112 and 114. In such an installation, obviously the plate 26 of the tube 24 cannot always be directly coupled to the plate side of the receiver as described before. However, it has been found that by placing a capacitor 116 having a long capacitance in the order of 0.1 microfarad between the lines 110 and 114, the high frequency signals produced by the transmitter 14 can be effectively coupled to the second phase of the system without causing undue leakage of the 60-cycle power. Thus, regardless of which phase the transmitter and receiver may be connected to, the system will be operative. The capacitor 116 also serves to prevent excessive attenuation of the 40-kilocycle signal in the event a high load of resistive character should be placed across the phase in which the transmitter is located.

A further problem is encountered in using the transmitter and receiver provided by the present invention in a 3-wire system. If the character of the load on one phase is different from that of the second phase, the transmitter and receiver will be tuned to somewhat different frequencies. However, the capacitor 116 has been found to alleviate this condition to a practical extent in that it is a large factor in determining the resonant frequency of both the transmitter 23 and the receiver 50.

Although the plate 26 of tube 24 associated with the transmitter 23 and the capacitor 60 associated with the receiver 50 can occasionally be connected to the common wire 112 to achieve compatibility of the system rather than depend on the shunting effect of the capacitor 116, the capacitor 116 is considered desirable because of the beneficial effects it provides in achieving better tracking and relieving the attenuation of the 40-kilocycle signal.

From the foregoing it will be seen that there is provided a system for signaling a receiving station from a sending station over the power circuit 20, 22. At the transmitting station there is provided the transmitter 14 in which there is provided a triode-connected pentode forming a portion of a modified Hartley circuit oscillator. The anode of the tube is connected directly to a first of the power lines. A tuning circuit including a series capacitor and an inductance is connected at one terminal of the capacitor to the anode of the tube. The juncture between the capacitance and inductance is connected by way of a grid leak circuit to the control grid of the tube. An intermediate tap on the inductance is connected to the second of the power lines. The extremity of the inductance is connected by way of a control switch to the cathode of the tube. Thus, the impedance of the line along with the impedance of the tuning circuit controls the frequency of the alternating signal appearing on the line 20, 22 when the anode of the oscillator tube is positive relative to the cathode. Thus, the transmitter is effective to apply high frequency signals to the line on alternate half cycles of the power voltage.

At the receiver a thyratron, normally nonconductive, is connected in a circuit connected across the lines 20, 22. The anode circuit of the thyratron is connected to the same line as the anode of the tube in the transmitter. A tuning circuit is connected across the power line in the receiver circuit and thus serves to tune the receiver to a frequency dependent upon the lumped constants of the tuning circuit and upon the impedance of the line itself. Since both the transmitter and receiver are controlled at least in part by the impedance of the line, they may be initially set for a given frequency and then connected to a line. The modification of the tuning due to the line connections will be identical in a substantial sense for both the transmitter and the receiver. A rely coil is connected in series with the thyratron to control a normally open switch. The switch will close only when signals are being received from the transmitter. A convenience outlet is provided on the receiver itself for connection to a utilization device. The utilization device may be a lamp at a location other than that in which the transmitter is located such as different rooms in a home.

The system may be provided with a further and more positive alarm means for use when and if desired. More particularly, it will be noted that in the transmitter the switch 32 is connected in series with a normally closed push button switch 33. The switch 33 may be operated by pushing a button 33*a* to open the circuit momentarily.

In the receiver a circuit is provided which is responsive to voltage changes at the anode 68 of the thyratron 66 to energize a bell or siren device such as the alarm 100. The alarm 100 is connected with one terminal directly to the upper conductor 51 and at the lower terminal by way of a switch 101 to the lower conductor 53 in the receiver circuit. The switch 101 is controlled by a relay coil 102.

A circuit between the anode 68 of tube 66 the relay coil 102 comprises a keyed pumping system together with a time delay network to assure operation reliably responsive to signals from the transmitter. More particularly, the circuit 103 provides a time delay unit which is responsive to positive-going pulses at the anode 68. The operation is such that the button 33*a* must be actuated three, four or five times in rapid succession before the relay coil 102 will close switch 101. The anode 68 is connected to a circuit which includes a diode 104, condenser 105, diode 106 and a neon tube 107. One terminal of the relay coil 102 is connected to the output of the tube 107 and by way of a resistor 108 to the line 51. The second terminal of the relay coil 102 is connected by way of conductor 109 to conductor 53. The juncture intermediate diode 104 and condenser 105 is connected by way of the parallel R–C circuit 110 to conductor 53. The juncture between condenser 105 and diode 106 is connected by way of diode 111 to conductor 53. The juncture between diode 106 and neon tube 107 is connected by way of the R–C circuit 112 to the conductor 53. The positive-going spikes appearing at anode 68 when switch 33*a* is repeatedly actuated serve to pump charge onto the condenser 112. When the charge on condenser 112 reaches a given level, the neon tube 107 will break down. The resistor 108 in series with the coil 102 normally controls the flow of ambient or holding current through the relay coil 102. However, when the tube 107 breaks down, the current in relay coil 102 is elevated to a level sufficient to close the switch 101, thereby closing the power circuit to the alarm 100. The alarm 100 may be a bell or may be a siren device which can be incorporated directly in the housing of the receiver circuit. If the system is employed as a household alarm unit, the transmitter may be positioned in a bedroom, as shown in FIGURE 1, with the switch cable 35 leading from the transmitter housing to a bedside location such as on a night stand or under a pillow. The receiver 16 may then be located for control of an outside floodlight. If circumstances are such as to arouse alarm, the switch 32 may be snapped closed, thereby actuating the transmitter to send a signal to the receiver and close the switch 86 to turn on the floodlight 18. If the condition causing concern persists and if a more positive alarms is desired, then an operator may actuate the switch 33*a* a plurality of times in rapid succession, whereupon the relay coil 102 will close the switch 101 applying power to the alarm device. The alarm bell or siren will then persist and continue to ring until push button 114 is actuated to interrupt the holding current. The time delay curcuit in the R–C network 112–113 has a time constant such that voltage pulses of the order of 30 volts each, appearing at the anode of tube 66 will be accumulated on condenser 113 over the time interval of several seconds during which the button 33*a* is actuated. Resistor 113 is of relatively high value to control the leakage from condenser 112. The R–C circuit 112–113 will require four or five pulses to be applied thereto in rapid succession before the relay will close, thus preventing operation in response to random or spurious signals.

In a preferred form of the invention a neon tube of type NE2H is suitable for use as tube 107. Such tube has a breakdown voltage of about 90 volts. The resistance 113 and the condenser 112 form a time-delay circuit such that the 30-volt pulses appearing at the anode of tube 66 will reach the firing level of 90 volts in three or four actuations of the push button 33*a*. A greater or smaller number of actuations of the control switch may be provided for by setting the leakage rate from a condenser 112 through the resistor 113. The higher the resistor, the less the leakage, the fewer will be the number of pulses required to pump the condenser 112 to a firing voltage of the tube 107. The lower the resistance, the greater will be the leakage, and thus the greater number of pumping operations necessary for firing. The relay 102 may be of the type which would require about 6 milli-amps to close and would be held closed by current of the order of one-half the actuating current or about three milli-amps with positive release at a level of about one and one-half milli-amps. Thus, the resistance 108 would be of relatively high value to control the holding current level.

Figure 5:
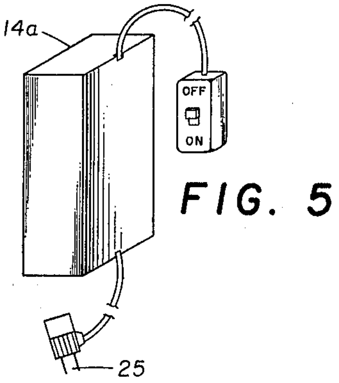
FIGURE 5 is a perspective view showing the rear of the transmitter housing unit.
Figure 6:
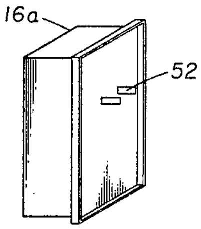
FIGURE 6 is a perspective view showing the rear of the receiver housing unit.

While the device as above described has been shown as involving plugs 25 and 52 mounted in a power cord type housing, it has been mentioned that such plugs may be mounted directly on the housings for the transmitter and receiver, respectively. The latter type of mounting has been found to be preferred for the receiver and a receiver unit so equipped is illustrated in FIGURE 6. The transmitter housing 14*a*, FIGURE 5, is of such size as could be conveniently plugged into an outlet in a home electrical system. However, plug 25 is cord mounted and is remote from the housing 14*a* with the cord 35 extending therefrom. FIGURE 6 illustrates a rear perspective view of the housing 16*a* for the receiver 16 with the plugs 52 mounted in the rear face and extending therefrom. Thus the housing 16*a* may be supported by the plugs 52 as they are inserted into the convenience outlet 12*b* of FIGURE 2. The front of the receiver housing 16*a* has the same appearance as the unit 54 of FIGURE 2. As shown, it is preferred that the upper set of contacts of outlet 54*a* be connected directly to the plug terminals 52, whereas the contacts of outlet 54*b* are connected by way of switch 86 to the lines 51 and 53. This will permit the receiver to be utilized either directly in the normal sense or remotely as under the control of transmitter 14.

The system has been found applicable to control lighting fixtures installed in home systems by mounting the receiver circuit in or on the convenience outlet box in which the usual control switch is housed. In such case, the receiver circuit, including switch 86, would be connected in parallel with said control switch for either local or remote control of a given utilization device such as a light, stove or other power-operated element.

It will be appreciated that the foregoing system may be utilized for purposes other than household alarms. It is particularly desirable in that relatively simple and inexpensive system components are to be employed on a power circuit wherein the power circuit supplies the actuating power to a utilization device as well as to the transmitter and receiver and at the same time serves as the transmission link therebetween. The actuation of the transmitter on alternate pulses of the alternating power voltage permits simplification in circuit elements in that a separate power supply is not required, the positive cycles as applied to the anode of the transmitter tube serving as the power supply voltage.

Regardless of the nature of the device controlled by the system of the present invention, there is provided at the sending station a tuning circuit connected across a power circuit where the tuning circuit controls a signal generator for producing an output signal dependent at least in part upon the impedance of the power circuit with the output of the signal generator applied to the power circuit. At the receiving station a tuning circuit is connected across a power circuit for the control of a power applying circuit, the latter being responsive to signals of the frequency produced by the signal generator. The frequency response of the receiver may vary in dependence upon variations in power circuit impedance thereby tracking the signal generator. Thus, regardless of load there will be provided a transmitter-receiver system, the components of which at any time are tuned to a common frequency.

Having described the invention in connection with certain specific embodiments thereof, it is to be understood that further modifications may now suggest themselves to those skilled in the art and it is intended to cover such modifications as fall within the scope of the appended claims.

What is claimed is:

1. A transmitter for applying a telemetering signal to a power circuit which comprises:

(a) a tube having a heater, a cathode, control grid, and an anode, (b) a connection extending directly between said anode and one line of said power circuit, (c) a series capacitive-inductance circuit connected at one terminal of the capacitor to the anode of said tube, at an intermediate tap on the inductance to the second line of said power circuit, and at the extremity of the inductance to said cathode, (d) transformer means connected across said power circuit for applying heater current to said tube, and (e) a grid leak circuit connected between said control grid and an intermediate point on said inductance for applying bursts of high frequency alternating current to said power circuit on those half cycles of the voltage on said power circuit when said anode is positive relative to said cathode.

2. A receiver for use in a power line signaling operation where a transmitter is employed which generates a signal which is dependent upon the load on said line, comprising:

(a) a gaseous conductive device connected across said line, (b) a series inductance-capacitance circuit connected across said power line and connected at the center tap in said circuit to said gaseous device to initiate current flow through said gaseous device upon the appearance on said line of a signal of high frequency at which said circuit is resonant, (c) a utilization device connected across said line in series with a circuit controller, and (d) a connection between said controller and said gaseous device including polarizing means and delay means for actuating said controller in response to abrupt termination of current flow through said gaseous device a predetermined number of times within a given time interval.

3. A receiver for use in power line signaling operation where a transmitter is employed which generates a signal which is dependent upon the load on said line, comprising:

(a) a thyratron device connected at the anode thereof to a first power line conductor by way of a parallel circuit, one side of said parallel circuit comprising a capacitor and the other side being resistive and including a current-actuated control element in series, (b) a series inductance-capacitance circuit connected at the capacitance extremity to said first power conductor and at the inductance extremity to a second power conductor, (c) a connection between the inductance-capacitance junction and the cathode of said device for control of the cathode voltage in dependence upon presence or absence of signals on said line of the resonant frequency of said series circuit, (d) a voltage divider network connected across said line and connected at a mid-point to a control terminal of said device, (e) a controlled circuit connected across said line including a switch actuated by said control element, and (f) a polarizing delay circuit connected between the anode of said device and said control element to actuate said control element only in response to abrupt termination of circuit flow through said device of predetermined character and number.

4. A receiver for use in a power line signaling operation where a transmitter is employed which generates a signal which is dependent upon the load on said line, comprising:

(a) a triggerable unidirectional conductive device connected across said line, (b) a series inductance-capacitance circuit connected across said power line and connected at the center tap in said circuit to said device to initiate current flow through said device upon the appearance on said line of a signal of high frequency at which said circuit is resonant, (c) a utilization element connected across said line in series with a circuit controller, and (d) a connection between said controller and said device including polarizing means and delay means for actuating said controller in response to abrupt termination of current flow through said device a predetermined number of times within a given time interval.

5. A receiver for use in a power line signaling operation where a transmitter is employed which generates a signal which is dependent upon the load on said line, comprising:

(a) a triggerable unidirectional conductive device having a trigger connection and connected to a first power line conductor by way of a parallel circuit, one side of said parallel circuit comprising a capacitor and the other side being resistive and including a current-actuated control element in series, (b) a series inductance-capacitance circuit connected at the capacitance extremity to said first power conductor and at the inductance extremity to a second power conductor, (c) a connection between the inductance-capacitance junction and one terminal of said device for control of the voltage at said terminal in dependence upon presence or obsence of signals on said line of the resonant frequency of said series circuit, (d) a voltage divider network connected across said line and connected at a mid-point to said trigger connection, (e) a controlled circuit connected across said line including a switch actuated by said control element, and (f) a polarizing delay circuit connected between said first power line conductor of said device and said control element to actuate said control element only in response to abrupt termination of circuit flow through said device of predetermined character and number.

References Cited by the Examiner

UNITED STATES PATENTS

| | | | |
|---|---|---|---|
| 1,834,771 | 12/1931 | Eastman | 340—310 |
| 2,177,843 | 10/1939 | Seeley. | |
| 2,235,169 | 3/1941 | Roberts | 340—310 X |
| 2,312,127 | 2/1943 | Shephard | 340—310 |
| 2,388,576 | 11/1945 | Seeley et al. | 340—310 |
| 2,484,700 | 10/1949 | Fitzsimmons. | |
| 2,915,743 | 12/1959 | Stewart et al. | 340—310 |
| 3,011,102 | 11/1961 | Balan | 340—310 X |
| 3,058,095 | 10/1962 | Reynolds | 340—310 X |
| 3,204,245 | 8/1965 | Dykaar. | |

OTHER REFERENCES

Publication: "Basic Course in Electronics," 2nd edition, U.S. Naval Institute, George Banta Publishing Co., p. 125.

NEIL C. READ, *Primary Examiner.*

H. I. PITTS, *Assistant Examiner.*